United States Patent [19]
Worrall, Jr.

[11] 3,784,230
[45] Jan. 8, 1974

[54] UTILITY TRAILER

[76] Inventor: Ashton L. Worrall, Jr., 325 Edison-Furlong Rd., Doylestown, Pa. 18901

[22] Filed: Dec. 27, 1971

[21] Appl. No.: 212,118

[52] U.S. Cl............... 280/491, 280/78, 280/106.5
[51] Int. Cl............................................. B60d 1/04
[58] Field of Search................ 280/78, 491, 414 R, 280/460 R, 106.5

[56] References Cited
UNITED STATES PATENTS

| | | | |
|---|---|---|---|
| 2,256,038 | 9/1941 | Woodruff | 280/78 |
| 1,880,703 | 10/1932 | Bischoff | 280/78 |
| 2,470,978 | 5/1949 | DuBrie | 280/78 |
| 1,237,507 | 8/1917 | Gregory | 280/78 |

*Primary Examiner*—Robert R. Song
*Attorney*—Vern L. Oldham et al.

[57] ABSTRACT

A lightweight serviceable utility trailer which can double as a wheelbarrow. The trailer includes a trailer body with a support frame therefor. A pair of support arms are provided for pivotal connection to the trailer to convert it to a wheelbarrow type of vehicle. A trunnion means pivotally connects the trailer frame to a snubber and wheel assembly for support purposes. Clamp members are provided on the frame to secure the trailer to a vehicle.

6 Claims, 8 Drawing Figures

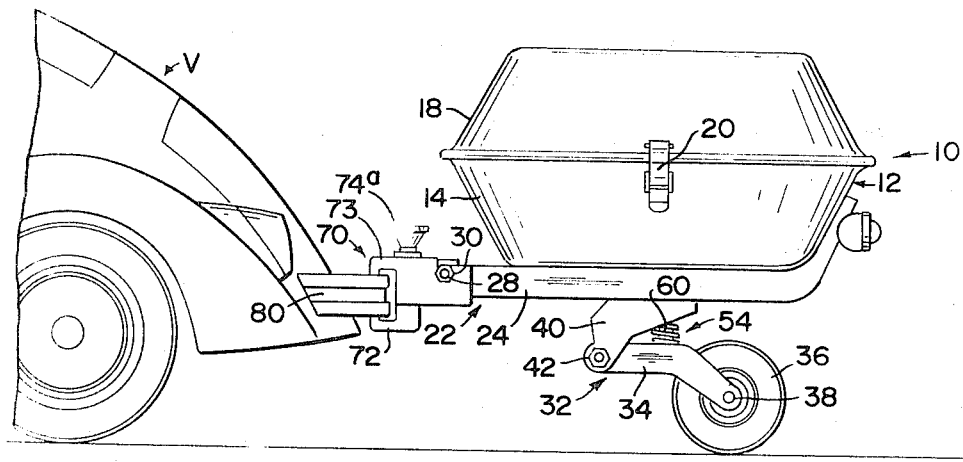
FIG. 1
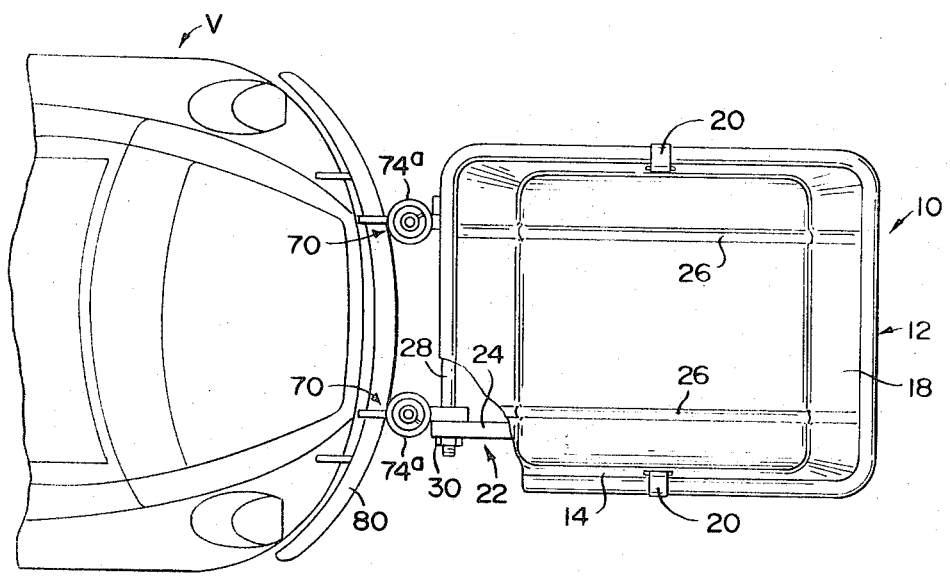
FIG. 2
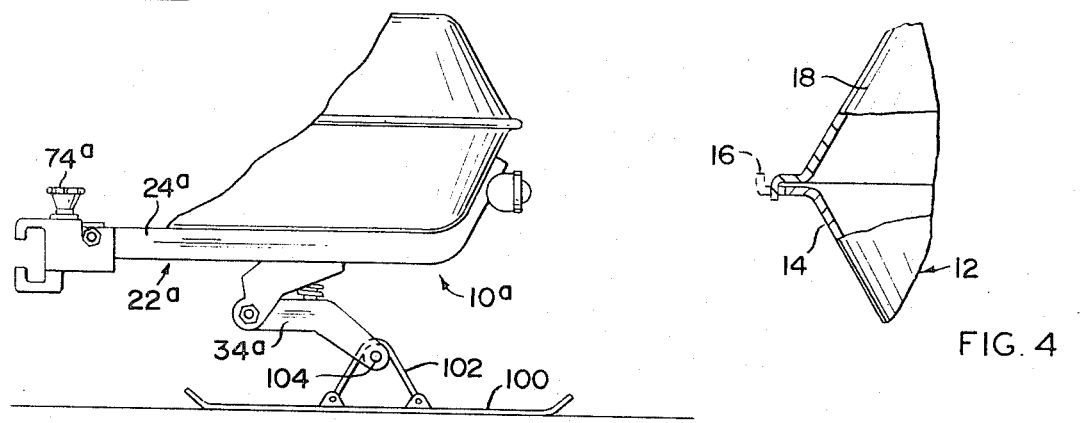
FIG. 3
FIG. 4

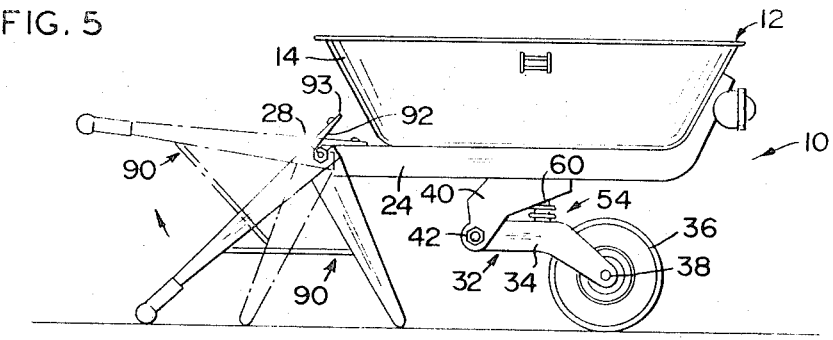
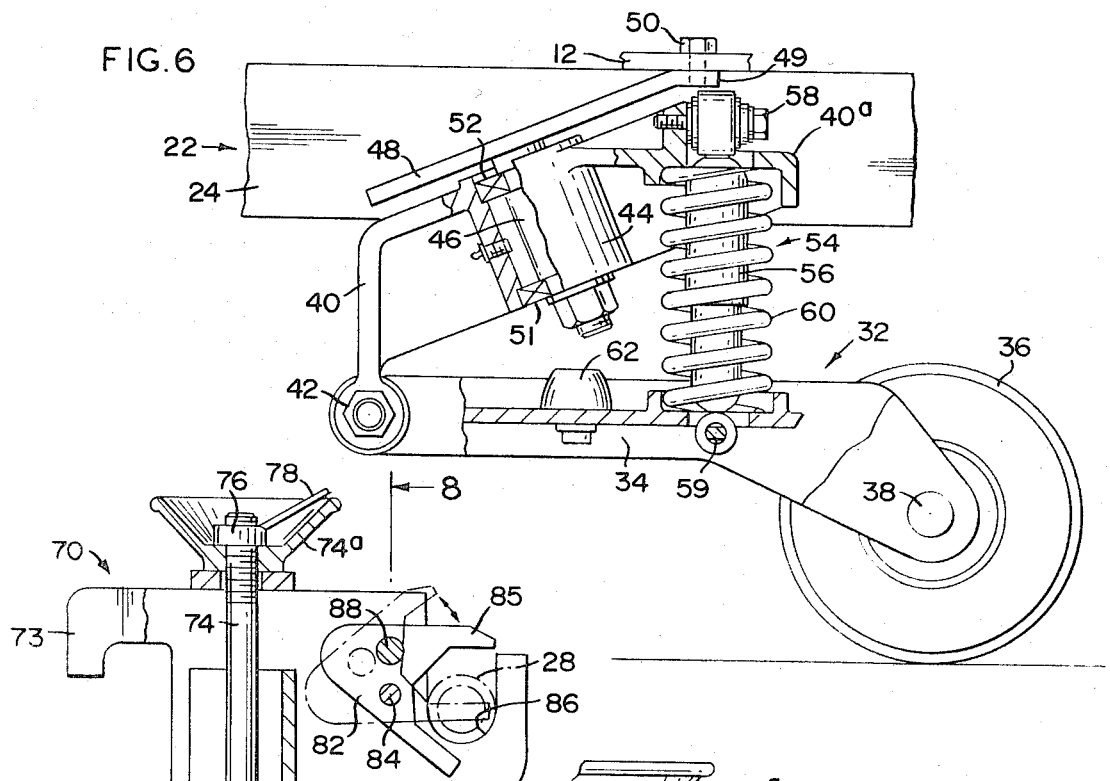
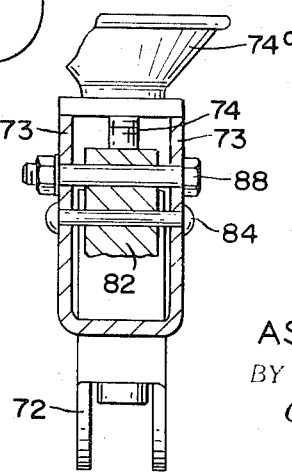
INVENTOR
ASHTON L. WORRAL JR
BY
Oldham & Oldham
ATTORNEYS.

UTILITY TRAILER

In general, the present invention relates to sturdy utility trailers particularly designed for attachment to so-called sports or foreign cars wherein a small but sturdy load carrying member is desired for high speed travel.

BACKGROUND OF THE INVENTION

Heretofore, there have been various types of trailers provided for attachment to vehicles for hauling desired articles from one place to another. However, most of such trailers have been adapted for use with standard size cars and it has been proposed to provide smaller trailers for use with smaller size vehicles. However, insofar as I am aware, no such smaller trailers have been completely satisfactory.

Reference is made to prior types of constructions such as are shown in U.S. Pat. Nos. 2,256,038; 1,992,808 and/or 1,794,630.

The general object of the present invention is to provide an improved lightweight utility trailer of small size particularly adapted for use with small vehicles to be pulled thereby and characterized by the provision of two attachment members for engaging the towing vehicle at spaced lateral portions thereof.

Another object of the invention is to provide a utility trailer which can readily be converted for use as a wheelbarrow when not being pulled by a vehicle.

A further object of the invention is to provide an improved automobile trailer which has a load support wheel provided thereon adapted for a full swiveling motion with relation to the trailer and providing complete maneuverability or tracking action for the utility trailer when towed by a vehicle.

Another object of the invention is to provide a utility trailer with improved suspension means; to provide a trailer which is inherently stable and has an improved resilient support system provided therefor; to provide a utility trailer which is readily engaged with a vehicle or disengaged therefrom; and to provide a utility trailer which is readily converted from a trailer over to a wheelbarrow by removal of a pair of uncomplicated bumper clamps and installation of preformed wheelbarrow handles readily engageable with the trailer unit for use as a manually movable wheelbarrow.

The foregoing and other objects and advantages of the invention will be made more apparent as the specification proceeds.

Reference now is made to the accompanying drawings, wherein:

FIG. 1 is a side elevation of a utility trailer embodying the principles of the invention, as attached to a vehicle;

FIG. 2 is a plan view of the trailer of FIG. 1;

FIG. 3 is a fragmentary side elevation of the trailer when provided with a support ski in place of a wheel supporting member;

FIG. 4 is a fragmentary vertical section through the trailer and cover of FIG. 1;

FIG. 5 is a side elevation of the utility trailer of FIG. 1 as converted for use as a wheelbarrow;

FIG. 6 is a fragmentary enlarged section through the wheel and support means provided for the utility trailer;

FIG. 7 is a fragmentary enlarged section of the clamp means for securing the trailer to a vehicle; and FIG. 8 is a vertical section taken on line 8—8 of FIG. 7.

When referring to corresponding members shown in the drawings and referred to in the specification, corresponding numerals are used to facilitate comparison therebetween.

SUBJECT MATTER OF THE INVENTION

The present invention relates to a utility trailer comprising as one embodiment thereof a trailer body, a support frame for the trailer body and including a pair of elongate members positioned below the trailer body, support means for the trailer body including a wheel support arm pivotally secured to a second support arm for movement in a vertical plane, snubber means connected between the wheel support arm and the second support arm for resiliently resisting movement therebetween, a support wheel journalled on the support arm at the rear end thereof, and trunnion means including a substantially vertically positioned pivot pin connecting the second support arm to the trailer body for operative engagement therewith whereby the utility trailer has a very desirable tracking action and can be transported at high speeds. Additionally, a pair of clamp members are removably engageable with the frame means for the trailer body and for locked engagement with a bumper of a vehicle for towing the utility trailer. A pair of wheelbarrow arms can replace the clamp members.

Attention now is directed particularly to the details of the construction shown in the accompanying drawings, and a utility trailer indicated as a whole by the numeral 10. This utility trailer 10 includes a trailer body 12 which preferably is made from molded plastic material and wherein a light-weight but high strength body 12 can be obtained by molding any suitable resinous material, which may be reinforced with fiberglass or other materials and wherein large numbers of bodies 12 can be provided at minimum expense. These trailer bodies 12 include upwardly extending edge or end walls 14 that terminate in a vertically upwardly extending edge flange 16. Then it is normally desirable to provide a duplicate of the trailer body 12 but which is inverted in position whereby a cover 18 is provided which will engage with the upwardly extending side and end walls 14 of the trailer body and provide an effective cover therefor. FIG. 4 of the drawings indicates that a section of the edge flange indicated at 16 is cut or otherwise removed from the trailer body whereby an effective sealed connection or engagement occurs between the cover 18 and the trailer body 12. Any suitable means, such as belts or equivalent means indicated at 20 can secure the cover 18 removably to the trailer body.

Obviously the trailer cover 18 is preferably made from the same materials and in the same manner as the trailer body 12.

In order to provide a frame means 22 for the utility trailer 10, a pair of elongate members, usually two tubes 24, are positioned in longitudinally extending recesses or grooves 26, formed in the trailer body 12 and are suitably secured together normally at their rear ends. The tubes are secured together by a front bar 28 as by being welded to extend therebetween and normally extend slightly therebeyond. This bar or reinforcing means 28 usually has threaded end portions thereon for receiving members such as lock nuts 30 or the like thereon as referred to hereinafter in more detail.

The utility trailer 10 has a novel and improved support means provided therefor whereby the trailer, which is supported on only one support arm with a wheel provided at the rear end thereof, will effectively track the towing vehicle and with the load on the support arm always being above or forwardly of the support wheel whereby the load will always be centered with relation to the towing vehicle and the utility trailer can be towed at high speeds safely but yet to provide a cushioned ride for the articles received in the utility trailer. Thus support means, indicated as a whole by the numeral 32, is provided for the utility trailer and this support means includes a substantially rearwardly directed support arm 34 which has an aircraft type pneumatic rubber tire and wheel assembly indicated by the numeral 36 journalled thereon as by an axle 38. Such support arm 34 is itself pivotally connected to a second support arm 40 which extends upwardly and rearwardly from a bolt or equivalent member 42 that secures the two support arms 34 and 40 together for relative pivotal movement in a vertical plane for support of the utility trailer. It is a feature of the invention that the second support arm 40 has means such as tubular section 44 thereon that is adapted to journal a trunnion means or pin 46 therein. This trunnion pin 46 is positioned substantially on a vertical axis and with the trunnion pin 46 being engaged with and carried by a support plate 48 to extend downwardly therefrom. The support plate or bracket 48 has an upper section 49 that can be engaged, as by a bolt 50 with a bottom portion of the trailer body 12. Any suitable support bearings 51 and 52 are associated with the trunnion pin 48 to aid in positioning it operatively in the sleeve 44 for arcuate movement of the support arm 40 on the axis of the trunnion pin 46. Hence, the assembly of the two support arms 34 and 40 together with the support wheel 36 will swivel in a horizontal plane with relation to the utility trailer 10 and thus provide for desirable castering action of these support means when the trailer is in transit, as well as to permit vertical movement of the one support arm 34 and support wheel thereon in relation to the second support arm 40.

To further cushion the load support action by the support means 32, a substantially conventional snubber 54 is provided and is operably connected between opposed portions of the support arms 34 and 40. This snubber means 54 includes a substantially conventional axially telescoping type of a resilient support means 56 that has the upper end thereof secured, as by a bolt 58, to an associated bracket 40a provided on the second support arm 40 whereas the lower end of the snubber 56 is secured to the support arm 34 on the lower surface thereof by a conventional bolt or equivalent member 59. The action of the snubber 56 is improved by positioning a coil spring 60 in compressed relationship between opposed surfaces of the support arms 34 and 40 and which may be provided with conventional brackets or flanges thereon to aid in seating the coil spring 60 in position. A suitable bumper 62 may be provided on the support arm 34 should any bottoming action of the upper or second support arm 40 in relation to the lower support arm be occasioned in use of the utility trailer.

The trailering action and an improved connection with the vehicle for the trailer 10 is obtained by the use of a pair of clamp members as indicated at 70 in FIG. 7. Each of these clamp members include a jaw 72 that is adjustably associated with the clamp frame 73 as by an elongate bolt 74 which has a cup-shaped attachment or washer member 74a provided at the upper end of the clamp and with a lock nut 76 securing the washer 74a in position. The lock nut 76 has an operating arm 78 extending therefrom to facilitate engaging the clamp 70 with an associated bumper 80 of the vehicle indicated at V.

As a pair of the clamps 70 are provided and the frame means 22 for the trailer includes a front support arm or bar 28, these clamps can be engaged with laterally spaced portions of the trialer frame to aid in securing it positively to the vehicle for only vertical movement in a vertical plane in relation to the vehicle. Thus, lock means such as a keeper latch 82 is pivotally secured to each of the clamp frames 73 as by a bolt 84 and with such latch having a finger 85 as adapted to overlie an upwardly open recess 86 provided in the clamp frame and which recess has the front frame bar 28 positioned therein. Hence, when desired, the locking latch 82 is kept in its operative position by engaging a bolt 88 with suitable apertures provided in the clamp frame for locking the latch finger into the position shown in FIG. 7. However, when this bolt 88 is removed and is repositioned with the latch in the dotted position shown in FIG. 7, at that time the recess 86 is open and the front frame bar can be removed from the recess in which it had been seated. Or, a suitable lock member can be used in place of the bolt 88.

As previously indicated, the utility trailer may have the clamps 70 removed and then, if desired, the front end portions of these tubes 24 of the trailer frame can have other suitable members engaged therewith such as a pair of substantially L-shaped wheelbarrow handle assemblies indicated at 90 in FIG. 5. These members are engaged with the front frame bar 28 by slots 92. Overhanging sections 93 are provided to engage the tubes 24 or the frame 2 to limit movement of these handles and facilitate use of the trailer as a wheelbarrow. The handle assemblies 90 serve as frame extenders.

FIG. 3 shows a modification of the invention where a trailer 10a is shown. In this instance, a frame 22 a is attached to the trailer body and it is supported on a suitable ski or slide runner 100. The runner 100 is pivotally attached to a wheel support arm 34a by suitable means including a bracket 102 and a support shaft 104 to adapt the trailer for use on snow or ice.

The trailer would have signal and light means thereon powered from the towing vehicle in known manners.

While several complete embodiments of the invention have been disclosed herein, it will be appreciated that modification of these particular embodiments of the invention may be resorted to without departing from the scope of the invention.

I claim:

1. A utility trailer for connection to a vehicle and comprising a trailer body, frame means for the body secured thereto and including a pair of elongate members engaging the trailer body, support means for the trailer body and including trunnion means positioned on a rearwardly downwardly inclined axis, said trunnion means including two trunnion members one of which is operatively secured to said trailer body, an axially directed support arm fixedly connected to the second of said trunnion members, said support arm extending longitudinally of said trailer in a normal position and having an end portion extending forwardly from said trunnion means, a wheel support arm pivotally secured at one end thereof to said end portion of the support arm for relative movement therebetween only in a vertical plane and extending rearwardly therefrom, a ground engaging means connected to the other end thereof, a support member on said support arm at the rear end thereof, and means connected between said support member and said wheel support arm for resilient support of said trailer body on said support means.

2. A utility trailer as in claim 1 where securing means are provided to attach said trailer body to a towing vehicle and comprise a pair of clamp members engageable with a vehicle bumper and a lockable latch means associated with each clamp member to engage said frame means.

3. A utility trailer as in claim 1 where said securing means are removable and a pair of frame extender means are engageable with said frame means to form a wheelbarrow from the trailer.

4. A utility trailer as in claim 1 and comprising said support arm and wheel support arm being pivotal in a horizontal plane with relation to said trailer body, said ground engaging means being under said trailer body and being adapted to track a towing vehicle in either direction of movement without reversing in position in relation to the trailer body.

5. A utility trailer as in claim 1 wherein said frame means include a front cross bar, and a pair of L-shaped handle means having slotted openings therein for pivotally engaging said cross bar and overhanging sections on the handle means to limit such pivotal movement in an upward direction.

6. A utility trailer as in claim 1 where securing means are provided to engage said frame means and attach said trailer body to a towing vehicle and where said securing means are removable, and a pair of handle means are removably engageable with said frame to form a wheelbarrow member from the trailer.

* * * * *